(12) United States Patent
Mestha et al.

(10) Patent No.: US 6,809,837 B1
(45) Date of Patent: Oct. 26, 2004

(54) ON-LINE MODEL PREDICTION AND CALIBRATION SYSTEM FOR A DYNAMICALLY VARYING COLOR REPRODUCTION DEVICE

(75) Inventors: Lingappa K. Mestha, Fairport, NY (US); Olga Y. Ramirez, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/451,215

(22) Filed: Nov. 29, 1999

(51) Int. Cl.⁷ .............................................. H04N 1/58
(52) U.S. Cl. .......................... 358/1.9; 358/1.1; 358/504
(58) Field of Search ........................ 358/1.9, 1.1, 1.13, 358/504, 518, 520, 523; 345/593, 600, 601, 603, 606, 610, 682; 382/167, 274; 399/127, 130, 211

(56) References Cited

U.S. PATENT DOCUMENTS

| | | | |
|---|---|---|---|
| 2,790,844 A | 4/1957 | Neugebauer | 358/518 |
| 3,870,968 A | 3/1975 | Vosteen et al. | 330/298 |
| 4,205,257 A | 5/1980 | Oguro et al. | 315/39.69 |
| 4,275,413 A | 6/1981 | Sakamoto et al. | 358/525 |
| 4,403,866 A | 9/1983 | Falcoff et al. | 366/132 |
| 4,500,919 A | 2/1985 | Schreiber | 358/518 |
| 4,724,461 A | 2/1988 | Rushing | 399/48 |
| 4,853,639 A | 8/1989 | Vosteen et al. | 324/457 |
| 4,887,217 A | 12/1989 | Sherman et al. | 700/117 |
| 5,003,327 A | 3/1991 | Theodoulou et al. | 347/112 |
| 5,045,882 A | 9/1991 | Roehrs et al. | 399/72 |
| 5,107,332 A | 4/1992 | Chan | 358/518 |
| 5,243,383 A | 9/1993 | Parisi | 399/50 |
| 5,416,613 A | 5/1995 | Rolleston et al. | 358/518 |
| 5,471,313 A | 11/1995 | Thieret et al. | 358/296 |
| 5,471,324 A | 11/1995 | Rolleston | 358/518 |

(List continued on next page.)

FOREIGN PATENT DOCUMENTS

| | | |
|---|---|---|
| EP | 0 582 997 A1 | 2/1994 |
| EP | 0 604 755 A1 | 7/1994 |
| EP | 0 625 847 A1 | 11/1994 |
| EP | 0 398 502 B1 | 6/1996 |
| EP | 0 741 491 A2 | 11/1996 |
| EP | 0 747 853 A2 | 12/1996 |
| EP | 0 785 672 A1 | 7/1997 |
| EP | 0 814 400 A2 | 12/1997 |
| EP | 0 854 638 A2 | 7/1998 |
| EP | 0 884 894 A2 | 12/1998 |
| EP | 0 891 078 A2 | 1/1999 |
| JP | 4-314768 | 11/1992 |

OTHER PUBLICATIONS

Olga Yaritza Ramirez, "Online System Identification Using an Adaptive Algorithm to Control Color Drift in a Marking Device", (Graduate Paper submitted in partial fulfillment of degree requirements, Sep. 1999, Rochester Institute of Technology, Rochester, NY.

(List continued on next page.)

*Primary Examiner*—Edward Coles
*Assistant Examiner*—Zebene Sanbet
(74) *Attorney, Agent, or Firm*—Fay, Sharpe, Fagan, Minnich & McKee, LLP (57) ABSTRACT

A method and apparatus for on-line predicting an analytical model of a dynamically varying color reproduction device comprises recursively executing a parameter adjustment algorithm for updating the parameters to the analytical model. Parameter adjustment is computed based upon a measured error signal detected between a sensed signal detected from actual device output and with an insitu sensor, and the analytical model output. The adjustment algorithm is recursively executed until parameter convergence effects a minimal error measurement, at which time the updated parameters are identified as accurate within the selected parametric model.

24 Claims, 3 Drawing Sheets

U.S. PATENT DOCUMENTS

| | | | |
|---|---|---|---|
| 5,481,380 A | 1/1996 | Bestmann | 358/504 |
| 5,483,360 A | 1/1996 | Rolleston et al. | 358/518 |
| 5,491,568 A | 2/1996 | Wan | 358/518 |
| 5,508,826 A | 4/1996 | Lloyd et al. | 358/501 |
| 5,528,386 A | 6/1996 | Rolleston et al. | 358/522 |
| 5,539,522 A | 7/1996 | Yoshida | 358/296 |
| 5,544,258 A | 8/1996 | Levien | 382/169 |
| 5,559,173 A | 9/1996 | Campo et al. | 523/303 |
| 5,581,376 A | 12/1996 | Harrington | 358/518 |
| 5,594,557 A | 1/1997 | Rolleston et al. | 358/518 |
| 5,612,902 A | 3/1997 | Stokes | 702/85 |
| 5,649,072 A | 7/1997 | Balasubramanian | |
| 5,662,044 A | 9/1997 | Löffler et al. | 101/492 |
| 5,664,072 A | 9/1997 | Ueda et al. | 358/1.9 |
| 5,671,059 A | 9/1997 | Vincent | 356/402 |
| 5,708,916 A | 1/1998 | Mestha | 399/46 |
| 5,717,978 A | 2/1998 | Mestha | 399/46 |
| 5,734,407 A | 3/1998 | Yamada et al. | 347/133 |
| 5,734,802 A | 3/1998 | Maltz et al. | 358/1.9 |
| 5,739,927 A * | 4/1998 | Balasubramanian et al. | 358/518 |
| 5,748,221 A | 5/1998 | Castelli et al. | 347/232 |
| 5,749,019 A | 5/1998 | Mestha | 399/46 |
| 5,749,021 A | 5/1998 | Mestha et al. | 399/49 |
| 5,754,918 A | 5/1998 | Mestha et al. | 399/48 |
| 5,760,913 A | 6/1998 | Falk | 382/167 |
| 5,809,213 A | 9/1998 | Bhattacharjya | 358/1.6 |
| 5,812,903 A | 9/1998 | Yamada et al. | 399/42 |
| 5,822,079 A | 10/1998 | Okuno et al. | 358/300 |
| 5,884,118 A | 3/1999 | Mestha et al. | 399/15 |
| 5,963,201 A | 10/1999 | McGreggor et al. | |
| 5,963,244 A | 10/1999 | Mestha et al. | 347/251 |
| 6,044,180 A * | 3/2000 | Brandestini et al. | 382/274 |
| 6,157,469 A * | 12/2000 | Mestha | 358/504 |
| 6,178,007 B1 * | 1/2001 | Harrington | 358/1.9 |
| 6,236,474 B1 * | 5/2001 | Mestha et al. | 358/520 |
| 6,344,902 B1 * | 2/2002 | Duke et al. | 358/1.9 |

OTHER PUBLICATIONS

Po–Chieng Hung, "Tetrahedral Division Technique Applied to Colorimetric Calibration for Imaging Media", Annual meeting IS&T, NJ May, 1992, p. 419–422.

Po–Chieng Hung, "Colorimetric Calibration for Scanners and Media", SPIE, vol. 1448, Camera and Input Scanner System, (1991).

Sigfredi I. Nin et al., "Printing CIELAB Images on a CMYK Printer Using Tri–Linear Interpolation", SPIE Proceedings, vol. 1670, 1992, p. 316–324.

Henry Kang, "Color Technology for Imaging Devices", pp. 318–327.

Ocean Optics, Inc., "Miniature Lights for Miniature Spectrometers".

Chang, James Z. et al., "Sequential Linear Interpolation of Multidimensional Functions", IEEE Transactions on Image Processing, vol. 6, No. 9, Sep. 1997.

Groff, Richard, Khargonekar, P., Koditschek, D., Thieret, T., Mestha, LK, "Modeling and Control of Color Xerographic Processes", Paper to be presented at the CDC99 meeting in Phoenix, Arizona, Dec. 7–10, 1999.

* cited by examiner

ON-LINE MODEL PREDICTION AND CALIBRATION SYSTEM FOR A DYNAMICALLY VARYING COLOR REPRODUCTION DEVICE

FIELD OF THE INVENTION

The subject invention pertains to the art of color management and image/text printing or display systems, and is especially applicable to a method and apparatus wherein a sensor monitors a color print output for on-line construction of an analytical model of printer operation. More particularly, the invention relates to system controls for modeling the printer by implementating an adaptive algorithm for estimation of analytical model parameters based upon processing of a relatively small number of control samples, target colors or other input signals, whereby the model is then useful for calibrating, diagnosing or standardizing operations of the printer.

Color correction and/or control should not be confused with color registration systems and sensors for insuring that colors are positioned properly, printed accurately, superposed correctly and/or adjacent to one another.

BACKGROUND OF THE INVENTION

In today's business and scientific world, color has become essential as a component of communication. Color facilitates the sharing of knowledge and ideas. Companies involved in the development of digital color print engines are continuously looking for ways to improve the total image quality of their products. One of the elements that affects image quality is the ability to consistently produce the same quality image output on a printer from one day to another, from one week to the next, month after month. Colors on a printer tend to drift over time due to ink/toner variations, temperature fluctuations, type of media used, environment, etc. There has been a long felt commercial need for efficiently maintaining print color predictability, particularly as electronic marketing has placed more importance on the accurate representation of merchandise in illustrative print or display media.

Color perception is a psychological and physiological phenomenon that involves three elements: light, object and observer. Color changes as light, medium (i.e., paper, monitor) and observer interact. Color may be perceived differently under different types of lighting. Light sources that affect color include incandescent and fluorescent light. The first makes color seem more red and orange while the second emphasizes green and yellow tones. Different types of media also affect color perception. Paper is a medium that reflects color ink. In other cases the medium can be transmissive or emissive. Transparencies are an example of a transmissive medium while a computer monitor is emissive. The third element in the phenomenon is the observer. Different people may see the same color slightly differently. In order to characterize color image quality, the interaction of these elements must be understood so that when colors are intended to be matched, i.e., monitor to printer, scanner to printer, etc., acceptable appearance results.

For automatic control systems spectral data is often used to represent color perception as a pattern of wavelengths that leave the object before being interpreted by a viewer. Spectral data defines color independent of light and observer influence. A spectrophotometer is a sensing device used to measure spectral data.

There are different ways of representing color. One way color is described consists of the following parameters: hue, lightness and saturation. Hue represents the actual color wavelength (red, blue, etc.), lightness corresponds to the white content while saturation captures the richness or amplitude in color. Another way of describing color uses the three dominant primary colors red, blue and green (RGB). By combining these primary colors, in different intensities, most colors visible to humans can be reproduced. Monitors and scanners use the additive RGB color process. Printers use the subtractive CMYK (cyan, magenta, yellow and black) color process based on light reflected from inks coated on a substrate. The color representations described above fail to reproduce color predictably because they are observer or device dependent.

The functional models presented in this specification use a device independent color space to consistently track a set of target colors. L*, a*, b* are the CIE (Commission Internationale de L'éclairage) color standards utilized in the modeling. L* defines lightness, a* corresponds to the red/green value and b* denotes the amount of yellow/blue.

On-line model prediction is also known as "system identification" in automatic controls literature. It is the terminology used for the process of characterizing a given control system. Characterization of the system can be done in two ways; non-parametric and parametric. In non-parametric system identification, the profile of the device can be measured by printing specific target colors as specified by the known standards. This profile is used as it is (without constructing any model of the device) while making rendering decisions/viewing of the customer colors on the monitor. This is one time measurement and does not use the historical information to construct any model. Whereas in the parametric system identification, predetermined target colors can be printed as chronological jobs in the banner sheet/header sheet or else the target colors can be extracted from the customer image and measured either by measuring straight from the output image or by rendering subset of customer colors as target color patches in banner or header page. (c.f. copending Xerox application D/99511Q1—L. K. Mestha, inventor, for a control system using dual mode banner color test sheets, herein incorporated by reference.) Using the target colors and their measured counterparts, parameters of the model are adjusted on-line during each measurement. The intention in the parametric system identification is to adjust the parameters of the model and refine it over time by using past and present color data so that the model is what customers can use in their desktops. If such models can be incorporated on the smart color sensor, then the model can be exported to customer workstations.

As business and scientific environments continue to require increasingly complex printing capabilities, and especially more consistent and accurate color matching outputs, there is a continuing need for improved on-line modeling and calibrating of color printing devices. Prior systems which have suggested color modeling (c.f., U.S. Pat. No. 5,612,902 to Stokes) have been unable to recursively converge the model parameters continuously and efficiently. Current needs are better served with analytical model processing in a way that accurate parameters of a parametric model can be quickly identified through a recursive computation scheme. In a network printing environment such a need is particularly apparent for multiple prints which can come from different sources to different printers all networked to one another. Multiple printers could be of the same or different color marking technologies/colorants/materials linked to the same or different color gamuts. The multiple printer outputs being compared could even come from different types of printers, such as black and white, highlight color and process color printers. The principal problems exist when all of the prints from these different types of printers will not match or even be consistent from day-to-day. The problem domain grows by several orders of magnitude when the images are viewed under different lighting sources/viewing angles and are printed on different paper with non-optimum originals. Color differences produced on documents could also be due to stochastic errors on the images as they are produced by the devices of varying types, technology and media.

The subject invention is particularly useful to provide solutions to the foregoing color problems for a wide range of color workflow practices and particularly in customer environments with complex printing requirements. Printing and product enhancements are provided that would enable customers to manipulate color documents on a screen before even printing/displaying an output on different output devices in ways that improve the productivity of a current workflow by taking advantages of output color sensors constructed within the printing devices.

The subject invention exploits a key enabling factor for these operational advantages by constructing and maintaining a current analytical model of the reproducing device operation (also known as the device profile or characteristic, input-output model within the reproducible color). A knowledge of the characteristic/model of the device at the time of manipulating color documents is a precise dynamic model of the marking device. The subject invention provides a new and improved method for constructing such a dynamic model by using a color sensor mounted within the output device. When a customer has a need to accurately match the colors displayed or printed on various output devices, such as monitors (CRT, LCD, etc.) and printers (xerographic, ink jet, ionographic, etc.), he/she can get the most current analytical model of the particular output device by simply making a call request to the device or the repository where the analytical model is stored. Prior art systems have been known to use such color sensors offline to measure the most current profile of the device, e.g., an ICC profile. The subject invention improves on such sensor utilization by not only the mere acquisition of the ICC profile, but also the extraction of a dynamic parametric model using color information accumulated over a period of time. In other words, a recursive model of the printer is generated which by nature will be more accurate and up-to-date than a mere profile with one time measurement. A customer can use the analytical model in a soft-proofing package to make aesthetic decisions or rendering decisions across devices to produce the best reproducible colors vivid or less vivid pictures, etc. Without having such an accurate dynamic model of the device, customer intentions/preferences cannot be met accurately, even though they can be conceived visually on a monitor. The subject invention provides for the creation and the effective wide spread use of such dynamic analytical models for devices that will enable consistent image reproduction initiated remotely across a system network.

BRIEF SUMMARY OF THE INVENTION

In accordance with the present invention, there is provided a method and apparatus for on-line prediction of an accurate analytical model of a dynamically varying color reproduction device such as a printer. The device includes a sensor for detecting a signal representative of the device color output. The form of the analytical model is predetermined and preferably comprises a parametrical model comprising initially a random set of parameters. An image is produced with the device in response to an input signal. The sensor senses an output signal from the generated image representative of the image. The analytical model computes a model output in response to the same input signal. A difference or error is determined between the image output signal and the model output. Updated parameters are generated for the model from the prediction algorithm utilizing the determined error and are then applied as replacements to the model. The model is inverted and a subsequent input signal is transformed by the inverted model for adjusting the subsequent input signal therewith. The foregoing steps are recursively executed with a plurality of subsequent input signals until the determined error is less than a preselected value whereby the analytical model comprises an accurate representation of the device operation.

In accordance with another aspect of the present invention, the foregoing steps for generating the accurate set of parameters for the analytical model can be utilized to create a model for accurately calibrating a color printer during run time operation with only a relatively few number of parameter updating computations. The transforming of subsequent input signals with the inverse of the updated parametric model continually converges the parameter set until an accurate updated parametric model is determined. The subsequent images produced by the printer have input signals which are then calibrated by the inverse of the updated parametric model so that transformation of the input signal through the color printer results in a precise and accurate transformation of the input signal to the desired output signal.

In accordance with a more limited aspect of the present invention, the parameter adjustment through the generating of the updated sets of parameters utilizes a recursive convergent least square estimation algorithm incorporating the determined error between the image output signal and the model output.

In accordance with yet another more limited aspect of the present invention, the adjustment can be implemented with either known selected test target signals as the input signal, or normal print/display path operating input signals.

In accordance with another aspect of the present invention, the analytical model, after successful updating, can be stored as a diagnostic program in a network system comprising a plurality of the reproducing devices. Devices in the network which generate an error greater than a certain selected value with the error computation steps above, are then recalibrated or repaired.

One advantage obtained by use of the present invention is an on-line model prediction process capable of constructing an accurate parametric model of a reproducing device. The model construction process is neither operator or human assisted.

Another advantage of the subject invention is that the models can be ported to a web or network system for communication to customer desktops on demand. The model can be embedded as a routine call request in a new service paradigm of future systems. Such calls can be part of document portals.

Another advantage of the subject invention is that the constructed analytical model can be used to diagnose reproducing device deviations from normal operating limits.

Yet another operational advantage of the invention is that the model construction can be realized with a relatively limited number of input signals for processing due to expeditious convergence of model parameters accurately representing device operation for the particular model selected.

Other benefits and advantages for the subject new methods and systems will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings, which form a part hereof and wherein.

DESCRIPTION OF THE PREFERRED EMBODIMENTS

Referring now to the drawings wherein the showings are for purposes of illustrating the preferred embodiments of the invention only and not for the purposes of limiting same, the Figures show a method and apparatus for generating a dynamic device model automatically using an insitu color sensor. The model can be exploited as either a forward or inverse model. The invention has practical applications where a customer can use the dynamic device model by making a simple call to the device in a soft-proofing package to make aesthetic or rendering decisions on the input he/she supplies (e.g., graphics) to the printer. Without having the dynamic model of the device, customer intentions or preferences cannot be met accurately, although they can be conceived visually on a monitor. This type of model is especially beneficial when trying to accurately reproduce predictable color.

Figure 1:
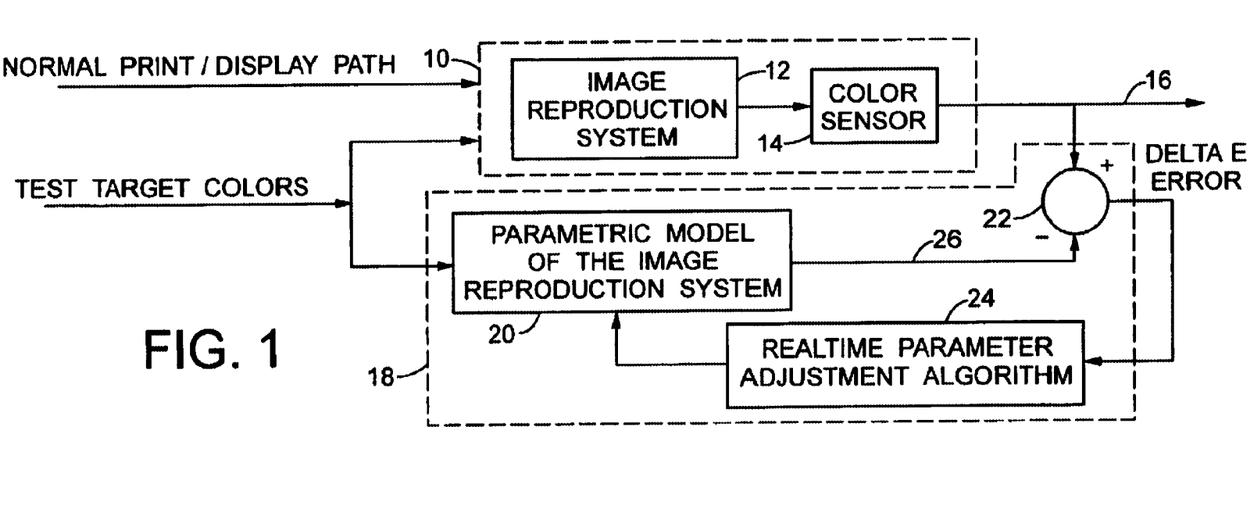
FIG. 1 is a schematic/block diagram of a first embodiment of a online model prediction system wherein test target colors are primarily utilized for convergent model parameter updating.

FIG. 1 depicts a block diagram representation of the overall system for a first embodiment. The plant 10 specified in this system diagram consists of an ink marking device 12 and a color-sensing device 14, although the invention is not restricted to ink marking devices alone and any image reproducing/displaying system such as printers, monitors or other imaging devices are intentionally included. In this application, the color-sensing device 14 is a spectrophotometer. The spectrophotometer provides the plant output 16 after capturing spectral information on the colors detected. (c.f copending Xerox application D/99511—Fred F. Hubble, III and Joel A. Kubby for a detailed description of such a spectrophotometer herein incorporated by reference.) The spectral information is a signal representative of the printed colors of the image and preferably comprises L*a*b* values, XYZ, Luv, etc., values depending on the desired color descriptions. For this description, only L*a*b* coordinate space values are used for describing color. A particular form of a parametric model is preselected off-line including a random parameter set before using the on-line model prediction steps of the invention to mathematically represent the plant 10. If for some reason the functional form of the model is not adequate to describe the entire gamut of the color device 12, then a partitioned model is used. The on-line system identification process will then switch between different functional models each corresponding to a partition of the gamut to update the parameters of the partitioned models depending on where the output colors are located in the printer gamut for given target colors. By cumulatively identifying the parameters of the partitioned models, a complete description of the device 12 will be constructed.

The actual on-line identification process on a sample-by-sample basis is described below. At first the default or initial random parameters are used to generate the error between the mathematical model and the actual device output (i.e., the measured colors). This error is then used inside an algorithm to update the parameters of the mathematical model. After updating the parameters of the model, the system identification loop will wait until after another set of measurements are available. Once they are available, again new errors are computed between the model output and the actual measurements. The model here will use the most current parameters. The error is then processed to compute the new set of parameters for the model. It is important to note that the error processing algorithm will determine how fast and how best the parameters are converged for a given functional model. This invention will use the convergent recursive least square estimation algorithm as the parameter estimator. It uses past and present data to compute the new set of parameters for the model. Thus measured data is processed sequentially as it becomes available to train the parameters of the model. It is also within the scope of the invention that the color processing can be represented by a plurality of analytical models each associated with a corresponding partition of a gamut of the reproduction device. The execution of the convergent algorithm would then comprise predicting, either on-line or with test target signals, a prediction of an accurate analytical model for each of the partitions.

Figure 3:
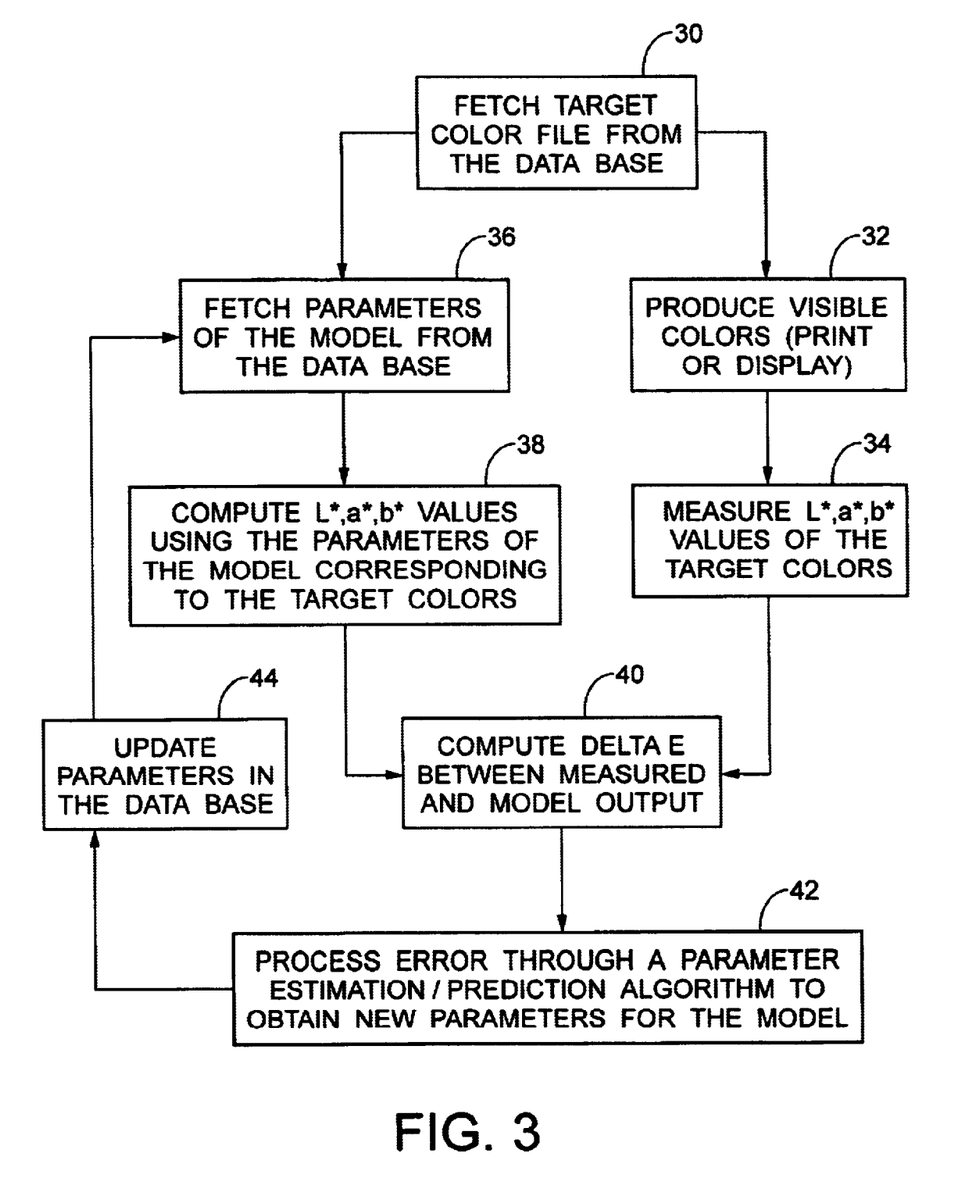
FIG. 3 is a flowchart detailing the processing steps for on-line model construction in accordance with the subject invention.

With reference to FIG. 3, and with continued reference to FIG. 1, the processing steps for the on-line construction of the parametric model are illustrated. In the embodiment of FIG. 1, test target colors are fetched 30 and simultaneously inputted to the plant 10 and the processing system 18 which generates the parametric model. The image reproduction system 12 produces 32 a plurality of colors (either print or display medium) which are then measured 34 by the sensor 14 to generate an output signal comparable to the parametric model output signal. In this embodiment, L*, a*, b* values of the printed target colors are measured as the output signal.

The input signals received by the parametric model 20 are first transformed by the model in accordance with at least initially a random set of parameters fetched 36 from an associated base (not shown), but thereafter will be continually updated as the recursive processing steps are executed. The model 20 computes 38 L*, a*, b* values corresponding to the target colors utilizing the fetched parameters. Comparator 22 then computes 40 a deltaE error comprising a difference between the measured output signal 16 from the sensor 14 with the model output signal 26 from the model 20. The deltaE error is then processed 42 through a selected parameter estimation/prediction algorithm 24 to obtain new parameters for the model 20. The preexisting parameters are updated 44 in the database and then subsequently applied to the model for the processing of the next subsequent target color input signals applied to the system. It is a feature of the invention that the algorithm 24 will converge the parameters to a set which when applied to the model will eventually produce a deltaE error less than a predetermined value so that the on-line model will with reasonable accuracy predict the colors of the image reproduction system 12.

For the purpose of illustration, the simple linear model shown below is applied, but, of course, more complex parametric modeling selection of the reproducing system is within the scope of the invention.

$$y = Mx + b \qquad (1)$$

The functional form of the mathematical model as that shown by Equation 1 above, is predetermined using input and output experimental data on the system. Once the best model is identified, we need to then tune the parameters of the model. For that, the adaptive algorithm is implemented to maintain the system specifications. In this illustration there are three inputs and three outputs (three input parameters to describe each input color and three output parameters to describe each output color). These inputs and outputs represent the L*a*b* values of a particular color. For simplification purposes, the input $L_i^*$, $a_i^*$, $b_i^*$ will be referred to as $x_1$, $x_2$, $x_3$ and the output $L_0^*$, $a_0^*$, $b_0^*$ as $y_1$, $y_2$, $y_3$. For this case Equation 1 can be expanded as follows, $$y = A\theta \qquad (2)$$

where A is the regression matrix and θ are the estimated parameters.

$$A = [1 \quad x_1 \quad x_2 \quad x_3] \qquad (3)$$

$$\theta = \begin{bmatrix} b_1 & b_2 & b_3 \\ M_{11} & M_{21} & M_{31} \\ M_{12} & M_{22} & M_{32} \\ M_{13} & M_{23} & M_{33} \end{bmatrix}$$

To obtain the initial guess for the parameters, we use the standard batch least squares equation shown below.

$$\hat{\theta} = [A^T A]^{-1} A^T y \qquad (4)$$

From this technique other parameter models can be built. For example, partial quadratic model:

$$A = [1 x_1 x_2 x_3 x_1^2 x_2^2 x_3^2] \qquad (5)$$

quadratic model:

$$A = [1 x_1 x_2 x_3 x_1^2 x_2^2 x_3^2 x_1 x_2 x_1 x_3 x_2 x_3] \qquad (6)$$

and cubic model:

$$A = [1 x_1 x_2 x_3 x_1^2 x_2^2 x_3^2 x_1 x_2 x_1 x_3 x_2 x_3 x_1^3 x_2^3 x_3^3] \qquad (7)$$

The recursive least squares (RLS) adaptive algorithm can be used to implement on-line system identification. It allows the machine to update the estimates of the parametric model while driving the error down to an acceptable level. Most adaptive algorithms are of the following form:

$$\text{new estimate} = \text{old estimate} + \text{weightfactor} * \text{error} \qquad (8)$$

The recursive least squares algorithm is no different. As mentioned above, the initial estimated parameters are determined from Equation 4. The next estimates, $\theta_{k+1}$, are built by tagging the next set of input and output data points. $a^T$ represents the regression matrix form for the next set of data while y is the following output $a_k$ is a regression vector at a kth measurement interval. The regression for $a_k$ is in the form shown by Equations 5, 6 or 7, depending on the choice of the model.

$$\theta_{k+1} = \theta_k + P_{k+1} a_{k+1} (y_{k+1} - a^T_{k+1} \theta_k) \qquad (9)$$

where $P_{k+1}$ is, $$P_{k+1} = P_k - \frac{P_k a_{k+1} a^T_{k+1} P_k}{1 + a^T_{k+1} P_k a_{k+1}} \qquad (10)$$

The regression vector $a_k$ as shown by Equations 9 or 10 is used for predicting parameters on-line whereas A, the regression matrix, is used for computing parameters once with input/output experimental data (initial guess when random parameters are not used.) The batch least square expression shown in Equation 4 may get used for the initial guess, and is not used for on-line parameter prediction.

Equations 9 and 10 achieved the on-line estimation by using the previous estimate and the error $(y_{k+1} - a^T_{k+1} \theta_k)$ between the outputs to converge to a new estimate. The convergence to a $\theta_k$ is obtained when the error function is driven to zero or to a preselected desirable threshold value.

The embodiment of FIG. 1 is primarily concerned with utilizing test color targets as the input for the on-line construction of the parametric model parameters. After such parameters have been converged to a desirable set, the model can be stored as part of a diagnostic program in a network system comprising a plurality of the reproducing devices. Devices in the network that would generate an error greater than a certain selected value are then recalibrated with new or the same test target color inputs. Alternatively, the model can be ported to a web or network system for communication to customer desktops on demand. The model can be embedded as a routine call request in a new service paradigm of future systems. Such calls can be part of document portals.

Figure 2:
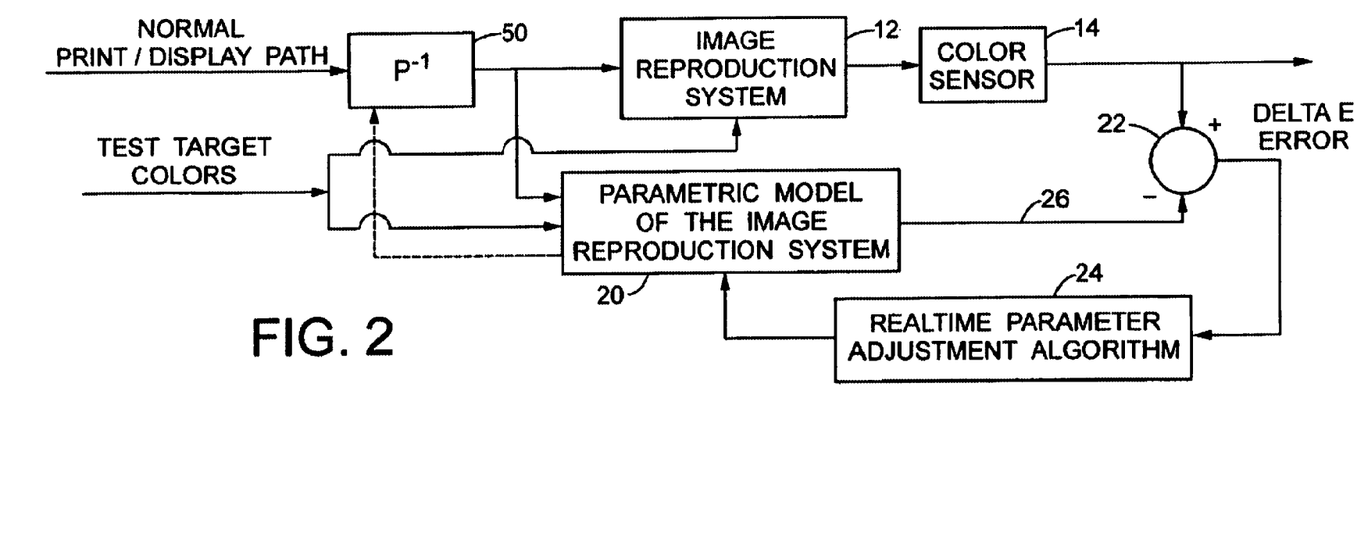
FIG. 2 is a schematic/block diagram of a system wherein normal print/display path input signals and test target signals are utilized for the generation of updated model parameters.

With particular reference to FIG. 2, an alternative embodiment of the invention is illustrated wherein the input signals are on a normal print/display signals path and are then preliminarily transformed by an inverted form 50 of the parametric model for further processing as in the embodiment of FIG. 1. In this embodiment, the sequential application of the inverted form of the model and then the model itself to input signals, which together with the plant 16 will result in an identity transformation, provided the inverted model 50 is the inverse of the most current model obtained from the model construction block 18. So long as the computed parameter set fails to construct a parametric model accurately mimicking the processing operation of the reproduction device 12 then an unacceptable deltaE error will be detected as a difference between the device 12 output and the model 20 output. Such difference will continue to result in parameter adjustment by the adjustment algorithm 24. The embodiment of FIG. 2 is particularly useful not only as a diagnostic tool but as a method of on-line calibrating an image production system without human or operator involvement. Test target color inputs, although similarly applicable, are not necessary as the system can run as a continuously operating calibrating assembly.

Yet another alternative embodiment is illustrated in FIG. 2 wherein test target colors are used to construct the parameteric model, by bypassing the inverted model 50. In this case, after the model 20 is deemed suitably accurate, the inverted form $P^{-1}$ is constructed for calibrated generation of either an LUT for on-line operation (such an LUT would be considered to be within block 50), or it is also foreseeable that the inverted model $P^{-1}$ itself could be used for input signal adjustment and resulting improved accuracy in color reproducing.

Actual Test Results

The test consisted of an actual implementation (Xerox DC40) that printed a number of color patches. The number of patches and colors are selected from the open loop simulation of the parametric model. Thirty-three different input target colors were selected and are graphed in FIG. 4. For illustration purpose, a cube in the input gamut was selected which covered about 60% of the reproducible space. Target colors were printed and read by a spectrophotometer in real-time. The output of the spectrophotometer represents the plant output 16 in FIG. 1. It is converted into L*, a*, b* coordinates and fed into the RLS algorithm. The performance index used was deltaE, where ΔE is the square root of the sum of the errors squared.

The best results were obtained with the quadratic and cubic model. Each curve represents the ΔE for a particular target color. After convergence was reached the mean ΔE and σ for quadratic model was 2.04 and 0.91, respectively.

Figure 4:
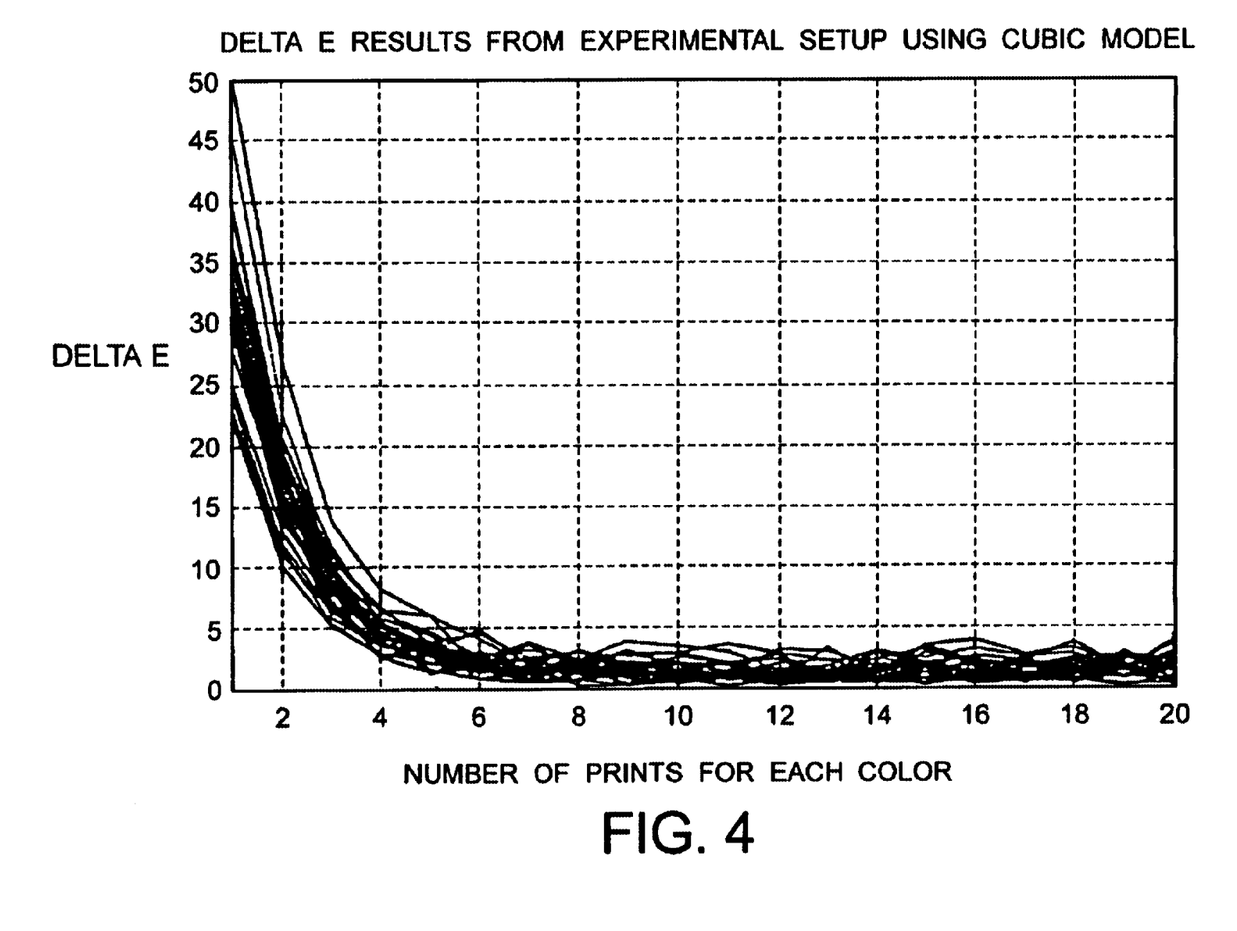
FIG. 4 is a graphical representation of parameter convergence and consequent reduction in determined error by the implementation of the subject invention.

However, the cubic model showed an improved mean of 1.71 and a of 0.76. These results show that one can use a series of target colors in a very effective manner to predict the forward model of the device. deltaE for a cubic Linear-In-The-Parameter model is shown in FIG. 4. Importantly, it can be seen that convergence to an acceptable error was realized after only six to eight prints were executed for each color.

The invention has been described with reference to the preferred embodiments. Obviously modifications and alterations will occur to others upon a reading and understanding of the specification. It is our intention to include all such modifications and alterations insofar as they come within the scope of the appended claims or the equivalents thereof.

Having thus described our invention, we now claim:

1. A method for online predicting an analytical model for a dynamically varying color reproduction device including a sensor for detecting a signal representative of device color output, wherein color processing of the device is represented by a preselected form of an analytical model comprising initially an inaccurate set of parameters, the method including steps of:

producing an image with the device in response to an input signal;

sensing with the sensor an output signal representative of the image;

computing from the model a model output in response to the input signal and comparable to the image output signal;

determining an error between the image output signal and the model output;

generating an updated set of parameters for the model from a prediction algorithm utilizing the error and applying the updated set to the model; and, recursively executing said steps with subsequent input signals until said error is less than a predetermined value whereby the analytical model including the updated set of parameters comprises an accurate representation of device operation.

2. The method as defined in claim 1 wherein the generating comprises converging the inaccurate set to the updated set with less than ten recursive executions of said steps.

3. The method as defined in claim 1 wherein the computing comprises utilizing either a linear affine model, a partial quadratic model, a quadratic model or a cubic model as the analytical model.

4. The method as defined in claim 3 wherein the determining comprises using a recursive convergent least squares estimation algorithm as the prediction algorithm.

5. The method as defined in claim 1 further comprising storing the analytical model as a diagnostic program in a network system having a plurality of the reproduction devices.

6. The method as defined in claim 1 wherein the color processing is represented by a plurality of analytical models each associated with a corresponding partition of a gamut of the reproduction device, and wherein the recursively executing said steps comprises the on-line predicting for each of the plurality of analytical models.

7. The method as defined in claim 1 wherein producing comprises applying a test target signal as the input signal.

8. The method as defined in claim 7 further including constructing an inverse of the analytical model including the updated set of parameters and using the inverse for generating a LUT or adjustment of the subsequent input signals.

9. A method for on-line predicting an analytical model of a dynamically varying color reproduction device including a sensor for detecting a signal representative of device color output, wherein color processing of the device is represented by a preselected form of an analytical model comprising initially a random set of parameters, the method including steps of:

producing an image with the device in response to an input signal;

sensing with the sensor an output signal representative of the image;

computing from the model a model output in response to the input signal;

determining an error between the image output signal and the model output;

generating an updated set of parameters for the model from a prediction algorithm utilizing the error and applying the updated set to the model;

inverting the model;

adjusting a subsequent input signal with the inverted model; and, recursively executing said steps with a plurality of subsequent input signals until said error is less than a predetermined value whereby the analytical model comprises an accurate representation of device operation.

10. The method as defined in claim 9 wherein the producing comprises applying a selected test target signal as the input signal.

11. The method as defined in claim 9 wherein the analytical model is stored as a diagnostic program in a network system comprising a plurality of the devices, the method further comprising identifying devices in the network generating an error greater than a second predetermined value, whereby the devices having varying color reproduction due to operational drift are easily identified.

12. The method as-defined in claim 9 wherein the computing comprises utilizing either a linear affine model, a partial quadratic model, a quadratic model or a cubic model as the analytical model.

13. The method as defined in claim 12 wherein the generating comprises utilizing a recursive convergent least square estimation algorithm as the prediction algorithm.

14. The method as defined in claim 9 wherein the color processing is represented by a plurality of analytical models each associated with a corresponding partition of a gamut of the reproduction device, and wherein the recursively executing said steps comprises the online predicting for each of the plurality of analytical models.

15. A color printer comprising:

an image reproduction system for generating an output image in response to an input signal;

a sensor for detecting a sensor signal representative of the output image; and, a processor comprising:
a parametric model of the image reproduction system for transforming the input signal into a model output;
a real-time parameter adjustment algorithm;
an inversion of the parametric model; and,
a comparator for comparing the sensor signal with the model output, wherein based upon an output from the comparator, the real-time parameter adjustment algorithm computes an updated set of parameters for the parametric model and the inversion of the parametric model, and the model and inversion are updated in accordance with the updated parameters, for recursively transforming a subsequent input signal with the updated inversion and the updated model.

16. The printer as defined in claim 15 wherein the parametric model comprises a linear affine model.

17. The printer as defined in claim 15 wherein the adjustment algorithm comprises a recursive convergent least square estimation algorithm.

18. The printer as defined in claim 15 wherein the parametric model comprises a plurality of models partitioned to cumulatively represent a gamut of the printer.

19. The printer as defined in claim 15 wherein the parametric model comprises a partial quadratic model.

20. The printer as defined in claim 15 wherein the parametric model comprises a quadratic model.

21. The printer as defined in claim 15 wherein the parametric model comprises a cubic model.

22. A method of calibrating a color printer comprising updating a set of parameters for a dynamic parametric model representing color space transformations by the printer of an input signal to an output signal, wherein the printer includes a sensor for detecting a signal representative of printer color output, the method comprising steps of:

producing an image with the printer in response to the input signal;

sensing with the sensor the color signal representative of the printer color output;

generating an output from the parametric model responsive to the input signal and comparable to the sensed color signal;

determining a difference between the sensed signal and the parametric model output;

adjusting the set of parameters in accordance with the difference for updating the parametric model;

generating an inverse of the updated parametric model; and, transforming a subsequent input signal with the inverse of the updated parametric model whereby subsequent images produced by the printer are made in accordance with the inverse of the updated parametric model.

23. The method as defined in claim 22 wherein the adjusting comprises processing the difference through an estimation/prediction algorithm for computing an updated set of parameters for the dynamic parametric model.

24. The method as defined in claim 22 wherein the producing comprises applying a selected test target signal as the input signal.

\* \* \* \* \*